(12) United States Patent
Steinmetz et al.

(10) Patent No.: US 11,123,764 B2
(45) Date of Patent: *Sep. 21, 2021

(54) USE OF LOW-MOLECULAR CARBOXYLIC ACIDS IN AQUEOUS BASE COATS

(71) Applicant: BASF COATINGS GMBH, Muenster (DE)

(72) Inventors: Bernhard Steinmetz, Muenster (DE); Peggy Jankowski, Wuerzburg (DE); Nadia Luhmann, Wuerzburg (DE); Michael Matura, Wuerzburg (DE)

(73) Assignee: BASF COATINGS GMBH, Muenster (DE)

( * ) Notice: Subject to any disclaimer, the term of this patent is extended or adjusted under 35 U.S.C. 154(b) by 560 days.

This patent is subject to a terminal disclaimer.

(21) Appl. No.: 16/072,059

(22) PCT Filed: Feb. 8, 2017

(86) PCT No.: PCT/EP2017/052678
§ 371 (c)(1),
(2) Date: Jul. 23, 2018

(87) PCT Pub. No.: WO2017/140540
PCT Pub. Date: Aug. 24, 2017

(65) Prior Publication Data
US 2019/0030565 A1    Jan. 31, 2019

(30) Foreign Application Priority Data
Feb. 18, 2016 (EP) .................................. 16156220

(51) Int. Cl.
| | | |
|---|---|---|
| *B05D 7/00* | (2006.01) |
| *B05D 5/00* | (2006.01) |
| *C09D 133/08* | (2006.01) |
| *C09D 133/10* | (2006.01) |
| *C09D 167/00* | (2006.01) |
| *C09D 175/06* | (2006.01) |
| *C09D 7/00* | (2018.01) |
| *C09D 175/00* | (2006.01) |
| *C08L 75/06* | (2006.01) |
| *C09D 133/04* | (2006.01) |
| *C08G 18/10* | (2006.01) |
| *B05D 5/06* | (2006.01) |
| *C08G 18/76* | (2006.01) |
| *C08G 18/42* | (2006.01) |
| *C09D 7/63* | (2018.01) |
| *C08F 283/00* | (2006.01) |
| *B05D 3/02* | (2006.01) |
| *C08K 5/09* | (2006.01) |

(52) U.S. Cl.
CPC ............ *B05D 7/534* (2013.01); *B05D 5/005* (2013.01); *B05D 5/06* (2013.01); *B05D 7/536* (2013.01); *C08G 18/10* (2013.01); *C08G 18/4288* (2013.01); *C08G 18/765* (2013.01); *C08L 75/06* (2013.01); *C09D 7/00* (2013.01); *C09D 7/63* (2018.01); *C09D 133/04* (2013.01); *C09D 133/08* (2013.01); *C09D 133/10* (2013.01); *C09D 167/00* (2013.01); *C09D 175/00* (2013.01); *C09D 175/06* (2013.01); *B05D 3/0272* (2013.01); *B05D 2202/10* (2013.01); *B05D 2401/20* (2013.01); *B05D 2401/21* (2013.01); *C08F 283/006* (2013.01); *C08K 5/09* (2013.01)

(58) Field of Classification Search
None
See application file for complete search history.

(56) References Cited

U.S. PATENT DOCUMENTS

| | | | | |
|---|---|---|---|---|
| 2004/0063851 A1* | 4/2004 | Neppl | ................ | C08G 18/6254 524/589 |
| 2008/0138627 A1* | 6/2008 | Swarup | ................ | C09D 133/10 428/413 |
| 2010/0273013 A1 | 10/2010 | Jin et al. | | |
| 2011/0253010 A1* | 10/2011 | Csihony | ................ | C09D 123/08 106/270 |
| 2016/0200936 A1 | 7/2016 | Steinmetz et al. | | |
| 2017/0145252 A1 | 5/2017 | Steinmetz et al. | | |
| 2018/0022944 A1 | 1/2018 | Steinmetz et al. | | |

FOREIGN PATENT DOCUMENTS

| | | |
|---|---|---|
| CN | 101258266 A | 9/2008 |
| CN | 102686658 A | 9/2012 |
| CN | 103087634 A | 5/2013 |
| DE | 4009858 A1 | 10/1991 |
| DE | 4437535 A1 | 4/1996 |
| EP | 1358278 B1 | 8/2006 |
| EP | 1534792 B1 | 5/2007 |
| EP | 1799783 A1 | 6/2007 |
| EP | 2840101 A1 | 2/2015 |
| EP | 2963073 A1 | 1/2016 |
| JP | 2009504823 A | 2/2009 |
| WO | 9115528 A1 | 10/1991 |

(Continued)

OTHER PUBLICATIONS

European Search Report for EP Patent Application No. 16156220.2, dated Aug. 17, 2016, 3 pages.

(Continued)

*Primary Examiner* — Michael P. Rodriguez
(74) *Attorney, Agent, or Firm* — Armstrong Teasdale LLP

(57) ABSTRACT

Described herein is a method of using organic carboxylic acids having 1 to 10 carbon atoms in preparation of aqueous basecoat materials for the purpose of improving the adhesion of the aqueous basecoat materials to overbaked clearcoat materials. Also described herein is a method for producing a muilticoat paint system, where a basecoat material is applied directly to an overbaked clearcoat film.

14 Claims, No Drawings

(56) References Cited

FOREIGN PATENT DOCUMENTS

| WO | 03011986 A1 | 2/2013 |
|---|---|---|
| WO | 2014044811 A1 | 3/2014 |
| WO | WO-2014/033135 A2 | 3/2014 |

OTHER PUBLICATIONS

International Search Report for International Application No. PCT/EP2017/052678, dated Jun. 1, 2017, 2 pages.

* cited by examiner

USE OF LOW-MOLECULAR CARBOXYLIC ACIDS IN AQUEOUS BASE COATS

CROSS-REFERENCE TO RELATED APPLICATIONS

This application is the national stage entry of PCT/EP2017/052678, filed on Feb. 8, 2017, which claims the benefit of priority to European Patent Application No. 16156220.2, filed Feb. 18, 2016, each of which is incorporated by reference in its entirety herein.

FIELD OF INVENTION

The present invention relates to the use of specific carboxylic acids of low molecular mass in aqueous basecoat materials for the purpose of improving the intercoat adhesion.

BACKGROUND

In automobile finishing and industrial coating, basecoat materials are customary intermediate coating materials that impart color and/or effect. The basecoat is covered by a clearcoat situated above it, this clearcoat protecting the basecoat system from effects of weathering and from mechanical and chemical attack. The basecoat and clearcoat materials are customarily applied wet-on-wet, and jointly cured by baking.

Whereas earlier in automobile finishing a primer-surfacer was applied initially—before the basecoat material—to the bodywork coated with an electrocoat material, with subsequent separate baking, more recent coating lines have eschewed separate baking, using coating compositions in part adapted accordingly. Instead, there is a joint baking of all the coating films applied to the electrocoat system. The aim of this in particular is a more energy-efficient operating regime.

In all of the operating regimes described above, it is of course also possible to apply more than one basecoat, in order thereby to obtain, for example, particular color effects.

A key quality criterion of coating systems is the adhesion of the cured coating compositions on the coated substrate. In the case of multicoat paint systems as described above, of the kind customary in automobile finishing, for example, great importance attaches also to the adhesion between the individual coats of paint, referred to as intercoat adhesion. The intercoat adhesion can be determined, for example, through the cross-cut test in accordance with DIN EN ISO 2409:2013-6.

From patent application WO 03/011986 A1 it is known practice, for the purpose of improving the intercoat adhesion, to add adhesion promoters in the form, for example, of inorganic phosphoric acids or boric acid and/or other boron compounds to the coating materials that are used for producing a multicoat paint system.

In the industrial painting of—for example—automobiles, the coated workpieces pass through an oven drying unit, in which the applied coating materials are cured through the supply of thermal energy. With the nowadays widespread metallic finishes, for example, the metallic basecoat material and the concluding clearcoat material are applied wet-on-wet and jointly cured.

At the oven drying stage, the parameters of baking time and baking temperature are in inverse proportion to one another, meaning that when the temperature is higher, the baking time is reduced, and for a longer baking time, a lower temperature is needed in order to obtain ideal curing of the finish. As a result of disruptions which occur again and again, on a purely statistical basis, in the drying unit, as a result of the transport apparatus coming to a standstill, for example, it may be the case that the workpieces spend too long, in relation to the prevailing temperature, in the oven drying unit. In this case, the phenomenon of overbaking may occur. Overbaking is understood as the baking of a coating material with an energy supply higher than that necessary for complete crosslinking. This may be caused by an overshoot of the baking time and/or of the baking temperature. In the case of overbaking, existing crosslinks between the molecules may be broken down again, in which case elimination products are formed. Overbaking may also be accompanied by greater crosslinking than is desired. In that case, as a general rule, the paint film will not attain the required resistance. The effects of overbaking include embrittlement or yellowing of the paint film (Römpp Lexikon Lacke and Druckfarben, Georg Thieme Verlag, 10th edition, 1998, p. 585).

It can be assumed that overbaking occurs if the baking time mandated for a coating material is exceeded by 20% or more and/or if the mandated baking temperature is exceeded by 5° C., more particularly 10° C., or more.

Owing to film defects customary in the painting operation, such as dirt, pinholes or craters, for example, renewed painting of the workpieces is necessary in certain cases even in the area of the original finish (OEM finish). The situation is therefore one of a dual finish employed within the OEM finishing operation. In this case, in general, the completed but defective original finish is coated with a second system composed of at least one basecoat and clearcoat.

It therefore follows from the above that on statistical grounds already it is impossible in the context of OEM finishing to avoid having to recoat OEM-coated workpieces in which the topmost coat of the multicoat paint system is an overbaked clearcoat—that is, it is impossible to avoid having to subject such workpieces to dual finishing. In the system that then results, therefore, a basecoat is located directly atop the previously applied and overbaked clearcoat. To finish, once again, a clearcoat is produced.

A system of this kind, namely a system produced by applying at least one basecoat directly to an overbaked clearcoat, before then in turn directly applying a clearcoat to the basecoat or to the topmost basecoat film, is of course something very frequently encountered, including in the refinishing context.

It has now been found that both in the manufacturer plant and in refinishing workshops, when a basecoat material and a clearcoat material are applied to an existing cured clearcoat film, extremely poor intercoat adhesion is a regular occurrence if the already-cured clearcoat is overbaked.

SUMMARY OF INVENTION

It is an object of the present invention to improve the intercoat adhesion on an already-cured overbaked clearcoat film when applying a further basecoat material.

Surprisingly it has been found that this object can be achieved by the addition of specific low molecular mass carboxylic acids to the basecoat material which is applied directly to the clearcoat film.

The present invention accordingly provides for the use of organic carboxylic acids having 1 to 10 carbon atoms in aqueous basecoat materials for the purpose of improving the adhesion of these coating materials to overbaked clearcoats.

DETAILED DESCRIPTION

The basecoat materials advantageously contain 0.1 to 5 wt % of organic carboxylic acids having 1 to 10 carbon atoms, based on the total amount of the aqueous basecoat material (that is, of the basecoat material as present before application to the substrate). Amounts of less than 0.1 wt % do not give an adequate effect in some cases. If the amount is greater than 5 wt %, defects may appear in the coating film resulting after curing.

With particular advantage, the amount of organic carboxylic acids having 1 to 10 carbon atoms in the aqueous basecoat material is from 0.3 to 1.5 wt %, based on the total amount of the aqueous basecoat material. With preference exactly one such carboxylic acid is used in the respective aqueous basecoat material.

As organic carboxylic acids having 1 to 10 carbon atoms it is possible ultimately to use all of the components that are known in this respect to the skilled person. Possible accordingly are aliphatic, aromatic or else araliphatic (mixed aromatic-aliphatic) carboxylic acids.

In the context of the present invention, the term "aliphatic", in agreement with the usual definition in the art, describes any organic compound or molecular moiety of an organic compound that is not aromatic and is not araliphatic. An aliphatic monocarboxylic acid consists accordingly, for example, of an aliphatic radical (the aliphatic moiety) and of a carboxylic acid group, while an aliphatic dicarboxylic acid consists of an aliphatic radical and two carboxylic acid groups. In one simple case the aliphatic radical may be a hydrogen radical, the corresponding carboxylic acid being formic acid and thus possessing one carbon atom. The aliphatic radical may also consist of carbon and hydrogen (for example, a methyl radical—corresponding carboxylic acid: acetic acid). It is also possible for the aliphatic radical to contain not only carbon and hydrogen but also heteroatoms in the form of bridging or terminal functional groups which are known per se. Examples of bridging groups are ether groups or ester groups. An example of a terminal functional group is a hydroxyl group.

The carboxylic acids are preferably monocarboxylic acids.

Preferred in the context of the present invention are aliphatic monocarboxylic acids, more particularly those having 1 to 6, very preferably 1 to 3, even more preferably 1 to 2 carbon atoms. Further preferred among these are those monocarboxylic acids which apart from the carboxylic acid group consist exclusively of hydrogen or of hydrogen and carbon, and which are saturated. Examples that may be given include formic acid and acetic acid.

Depending on the pH of the aqueous basecoat material (waterborne basecoat material), the carboxylic acids may of course be present wholly or proportionally in deprotonated form, i.e., in anionic form.

Aside from the fact that in the basecoat materials there is in any case at least one organic carboxylic acid having 1 to 10 carbon atoms, there are no particular features to the basecoat and clearcoat materials which can be used in accordance with the invention. The customary aqueous basecoat materials and the customary clearcoat materials can be used.

As is known and as was also indicated earlier on above, basecoat materials are color-imparting intermediate coating materials that are used for example in automobile finishing and in general industrial coating. A basecoat material therefore always comprises at least one pigment—that is, at least one color pigment and/or effect pigment known per se.

Preferred basecoat materials in the context of the present invention are those which comprise, as binders, polymers curable physically, thermally, or both thermally and with actinic radiation. A "binder" in the context of the present invention and in accordance with relevant DIN EN ISO 4618 is the nonvolatile component of a coating composition, without pigments and fillers. Specific binders, accordingly, include, for example, typical coatings additives, the reaction product of the invention, or typical crosslinking agents described later on below, even if the expression is used primarily below in relation to particular polymers curable physically, thermally, or both thermally and with actinic radiation, as for example particular polyurethane resins.

The aqueous basecoat materials for use in accordance with the invention more preferably comprise at least one polymer as binder, more particularly at least one polymer selected from the group consisting of polyurethanes, polyesters, poly(meth)acrylates and/or copolymers of the stated polymers, and especially preferably in any case, but not necessarily exclusively, at least one polyurethane poly (meth)acrylate. Further preferred are aqueous basecoat materials which comprise at least one hydroxyl-containing polymer from the above-stated group as binder. It is possible here, especially in the last-mentioned case, for there to be, additionally, a crosslinking agent present, in the form of at least one aminoplast resin and/or one blocked or nonblocked polyisocyanate, preferably an aminoplast resin. Among the aminoplast resins, melamine resins are preferred.

Furthermore, the aqueous basecoat material may further comprise at least one adjuvant. Examples of such adjuvants are salts which are thermally decomposable without residue or substantially without residue, resins as binders that are curable physically, thermally and/or with actinic radiation and that are different from the polymers already stated, further crosslinking agents, organic solvents, reactive diluents, transparent pigments, fillers, molecularly dispersely soluble dyes, nanoparticles, light stabilizers, antioxidants, deaerating agents, emulsifiers, slip additives, polymerization inhibitors, initiators of radical polymerizations, adhesion promoters, flow control agents, film-forming assistants, sag control agents (SCAs), flame retardants, corrosion inhibitors, waxes, siccatives, biocides, and matting agents. Also included may be thickeners such as inorganic thickeners from the group of the phyllosilicates or organic thickeners such as (meth)acrylic acid-(meth)acrylate copolymer thickeners or else polyurethane thickeners which are different from the binders employed.

The basecoat material for use in accordance with the invention is aqueous. The expression "aqueous" is known in this context to the skilled person. The phrase refers in principle to a basecoat material which is not based exclusively on organic solvents, i.e., does not contain exclusively organic-based solvents as its solvents but instead, in contrast, includes a significant fraction of water as solvent. "Aqueous" for the purposes of the present invention should preferably be understood to mean that the coating composition in question, more particularly the basecoat material, has a water fraction of at least 40 wt %, preferably at least 50 wt %, very preferably at least 60 wt %, based in each case on the total amount of the solvents present (i.e., water and organic solvents). Preferably in turn, the water fraction is 40 to 90 wt %, more particularly 50 to 80 wt %, very preferably 60 to 75 wt %, based in each case on the total amount of the solvents present.

The basecoat materials employed in accordance with the invention may be produced using the mixing assemblies and mixing techniques that are customary and known for producing basecoat materials.

The present invention likewise provides a method for producing a multicoat paint system, in which
(1) a substrate coated with a cured multicoat paint system is provided, the topmost coat of the multicoat paint system being an overbaked clearcoat,
(2) an aqueous basecoat material comprising at least one organic carboxylic acid having 1 to 10 carbon atoms is applied directly to the overbaked clearcoat from (1), and a polymer film is formed from the applied basecoat material,
(3) a clearcoat material is applied to the basecoat film obtained under (2), and then
(4) the basecoat film from (2) and the clearcoat film from (3) are cured together.

The statement that in stage (2) a polymer film is formed from the basecoat material should be understood as follows. Of course, following its application to a surface, the coating material forms a coat, i.e., a film. This film then comprises the polymers which distinguish a coating material. Present accordingly, then, is a film of polymer. This film of polymer may be flashed off or partly crosslinked—by interim drying, for example—even before further coats are applied. In no case, however, is the film already completely cured. This is also expressed by the fact that curing takes place only in stage (4). If the basecoat material were cured before stage (4), the curing in stage (4) would of course no longer even be possible.

Evidently, in stage (2) of the method of the invention, the aqueous basecoat material is applied directly to the overbaked clearcoat film. Between the thus-constructed basecoat film and the underlying overbaked clearcoat film, therefore, there are no further coats; the coats are in direct contact.

The particularization to "direct" is absent in connection with stage (3) of the method. The reason for this is that the concludingly applied clearcoat material need not necessarily be in contact with the basecoat film produced in stage (2) and comprising organic carboxylic acids having 1 to 10 carbon atoms, which is to say that it need not be located directly on the basecoat film produced in stage (2). It is also possible for there to be further coats, as for example further basecoats, produced between the two stated coats. In that case, of course, the clearcoat film is likewise located on the basecoat film from (2), but not directly thereon. These further coats are then cured together in stage (4) with the basecoat film from stage (2) and with the clearcoat film from stage (3).

The method therefore preferably encompasses a stage (2a) between stages (2) and (3), in which directly atop the basecoat film obtained under (2) at least one further basecoat material is applied and a polymer film is formed from this at least one further basecoat material, with a clearcoat material then being applied in stage (3) directly atop the basecoat film or the topmost basecoat film produced in stage (2a), and subsequently, in stage (4), the basecoat films from (2) and (2a) and the clearcoat film from (3) are cured together. The at least one basecoat material from stage (2a) is preferably different from the basecoat material from stage (2).

Serving as substrates are the substrates known fundamentally in this context, more particularly metallic or plastics substrates, of the kind known in connection with the automobile industry.

The multicoat paint system disposed on the substrate may more particularly be an aforementioned multicoat paint system in the automobile finishing sector. In any case, it is important that the topmost coat present is an overbaked clearcoat.

Since as already described the present invention can be employed with particular preference in the area of the dual finishing as part of OEM finishing or in the area of refinishing, the overbaked clearcoat from stage (1) is more particularly a clearcoat which represents the topmost coat of a multicoat paint system exhibiting defects. These defects may be present in the form of painting defects that are customary in painting operations, such as dirt inclusions, pinholes or craters in one or more coats of the multicoat paint system. They may also be defects which have come about as a result, for example, of mechanical influences.

All of the particular embodiments described above in connection with the inventive use, relating to the carboxylic acids, preferably monocarboxylic acids, and to the aqueous basecoat materials are of course also valid in connection with the method of the invention.

The invention is illustrated in detail hereinafter with reference to working examples.

EXAMPLES OF PAINT FORMULATIONS

With regard to the formulating constituents and amounts thereof indicated in the tables hereinafter, the following should be taken into account. Where reference is made to a commercial product or to a production protocol described elsewhere, the reference, irrespective of the particular principal designation selected for the constituent is to exactly that commercial product or exactly the product produced by the protocol referenced.

Accordingly, where a formulating constituent is given the principal identification "melamine-formaldehyde resin" and where a commercial product is specified for it, the melamine-formaldehyde resin is used in the form of exactly that commercial product. Any further constituents present in the commercial product, such as solvents, must therefore be taken into account if the aim is to deduce the amount of the active substance (the melamine-formaldehyde resin).

Accordingly, where a formulation constituent is referenced using a production protocol and where such production results, for example, in a polymer dispersion having a defined solids content, it is exactly this dispersion which is used. It does not matter whether the principal identification selected is the term "polymer dispersion" or only the active substance, as for example "polymer", "polyester" or "polyurethane-modified polyacrylate". This should be borne in mind if the intention is to deduce the amount of the active substance (the polymer).

All of the proportions indicated in the tables are parts by weight.

1. Production of a Non-Inventive Waterborne Basecoat Material 1

The components listed under "aqueous phase" in table A were stirred together in the order stated to form an aqueous mixture. In the next step an organic mixture was prepared from the components listed under "organic phase". The organic mixture was added to the aqueous mixture. The combined mixture was then stirred for 10 minutes and adjusted, using deionized water and dimethylethanolamine, to a pH of 8 and to a spray viscosity of 115 mPas under a shearing load of 1000 $s^{-1}$ as measured with a rotary viscometer (Rheomat RM 180 instrument from Mettler-Toledo) at 23° C.

TABLE A

Waterborne basecoat material 1

| Component | Parts by weight |
|---|---|
| Aqueous phase | |
| 3% Na—Mg phyllosilicate solution | 13.8 |
| Deionized water | 13.72 |
| Butyl glycol | 1.4 |
| Polyurethane-modified polyacrylate; prepared as per page 7 line 55 to page 8 line 23 of DE 4437535 A1 | 2.8 |
| 50% by weight solution of Rheovis ® PU 1250 (BASF), rheological agent, in butyl glycol | 0.53 |
| 10% by weight aqueous Rheovis ® AS1130 solution; rheological agent, available from BASF, in water | 4.8 |
| Polyester; prepared as per EP 12182050, page 28, lines 13-33 | 2 |
| Polyester; prepared as per example D, column 16 lines 37-59 of DE-A-4009858 | 1.43 |
| Melamine-formaldehyde resin (Luwipal ® 052 from BASF SE) | 1.9 |
| Melamine-formaldehyde resin (Resimene HM2608 ® 052 from Ineos) | 4.7 |
| 10% dimethylethanolamine in water | 1.2 |
| Polyurethane; prepared in analogy to EP 1358278 B1 (page 14 - lines 38-53) | 11.5 |
| Isopropanol | 1.3 |
| 2-Ethylhexanol | 1 |
| n-Butoxypropanol | 1 |
| Triethylene glycol | 1.28 |
| Isopar ® L from Exxon Mobil | 3 |
| Byk-347 ® from Altana | 0.53 |
| Pluriol ® P 900 from BASF SE | 0.7 |
| Tinuvin ® 1130 from BASF SE | 2.24 |
| Red paste | 15.5 |
| Blue paste | 0.43 |
| Interference pigment suspension | |
| Mearlin Ext. super red | 0.2 |
| Mixing varnish, prepared in analogy to EP 1534792 B1, column 11, lines 1-17 | 0.6 |
| Organic phase | |
| Aluminum pigment 1, available from Altana-Eckart | 0.23 |
| Aluminum pigment 2, available from Altana-Eckart | 0.1 |
| Paliocrome Orange from BASF SE | 3.56 |
| Butyl glycol | 4.66 |
| Mixing varnish, prepared in analogy to EP 1799783 A1, page 7, lines 40-47 | 3.89 |

Production of the Blue Paste:

The blue paste was produced from 69.8 parts by weight of an acrylated polyurethane dispersion produced as per international patent application WO 91/15528, binder dispersion A, 12.5 parts by weight of Paliogen® Blue L 6482, 1.5 parts by weight of dimethylethanolamine (10% in demineralized water), 1.2 parts by weight of a commercial polyether (Pluriol® P900 from BASF SE) and 15 parts by weight of deionized water.

Production of the Red Paste:

The red paste was produced from 40 parts by weight of an acrylated polyurethane dispersion produced as per international patent application WO 91/15528, binder dispersion A, 34.5 parts by weight of Cinilex® DPP Red, 2 parts by weight of a commercial polyether (Pluriol® P900 from BASF SE), 3 parts by weight of 1-propoxy-2-propanol and 20.5 parts by weight of deionized water.

2. Production of a Waterborne Basecoat Material I1 of the Invention

The waterborne basecoat material I1 was prepared in analogy to table A, but with further addition of 8.323 parts by weight of a mixture of 6.2 parts by weight of acetic acid (90% in water) and 93.8 parts by weight of a 10% dimethylethanolamine in deionized water.

3. Production of a Waterborne Basecoat Material I2 of the Invention

The waterborne basecoat material I2 was prepared in analogy to table A, but with further addition of 7.482 parts by weight of a mixture of 5.6 parts by weight of formic acid (85% in water) and 94.4 parts by weight of a 10% dimethylethanolamine in deionized water.

4. Production of a Waterborne Basecoat Material I3 of the Invention

The waterborne basecoat material I3 was prepared in analogy to table A, but with further addition of 7.2 parts by weight of a mixture of 11 parts by weight of lactic acid (88% in water) and 89 parts by weight of a 10% dimethylethanolamine in deionized water.

Comparison Between Waterborne Basecoat Materials 1 and I1 to I3

To determine the cross-cut resistance, multicoat paint systems were produced according to the following general protocol:

A steel sheet coated with a cured cathodic electrocoat system, and with dimensions of 10×20 cm, served as the substrate.

This metal sheet was first coated with the waterborne primer-surfacer SecuBloce MB 7 245, available commercially from BASF Coatings GmbH, applied in a dry film thickness of about 20 μm, and this coating was subjected to interim drying at a temperature of 70° C. over a period of 10 minutes. Applied subsequently to the interim-dried waterborne primer-surfacer film were the waterborne basecoat materials 1 and I1 to I3, in a dry film thickness of 25 μm; after 4 minutes of flashing at room temperature and also interim drying at 70° C. over 10 minutes, these basecoats were coated with the two-component clearcoat material Igloss® from BASF Coatings GmbH, applied in a dry film thickness of 40 μm. The resulting clearcoat film was flashed off at room temperature for 20 minutes. The waterborne basecoat film and the clearcoat film were subsequently cured in a forced air oven at 150° C. for 68 minutes to give a substrate coated with a multicoat paint system, the topmost coat of the multicoat paint system being an overbaked clearcoat.

The waterborne basecoat material 1 and, respectively, I1 to I3 were subsequently applied to the above-described original finish (multicoat paint system), in a dry film thickness of about 25 μm. After the basecoat material had been flashed off at room temperature for 4 minutes, it was subjected to interim drying in a forced air oven at 70° C. for 10 minutes. Applied atop the interim-dried waterborne basecoat film was the two-component clearcoat material Igloss® from BASF Coatings GmbH, in a dry film thickness of about 40 μm. The resulting clearcoat film was flashed off at room temperature for 20 minutes. The waterborne basecoat film and the clearcoat film were then cured in a forced air oven at 140° C. for 20 minutes to give a multicoat paint system.

The multicoat paint systems thus obtained were examined for cross-cut adhesion. For this purpose, the cross-cut was conducted to DIN EN ISO 2409:2013-6. The results of the cross-cut test were assessed according to DIN EN ISO 2409:2013-6. Low result scores denote improved adhesion. The results can be found in table 1.

TABLE 1

Cross-cut resistance of the systems comprising waterborne basecoat materials 1 and 11 to 13

| WBM system | Cross-cut result | Assessment |
|---|---|---|
| 1 | 5 | unsatisfactory |
| 11 | 0 | satisfactory |
| 12 | 0 | satisfactory |
| 13 | 3 | not completely satisfactory |

The results emphasize that the use of specific carboxylic acids in waterborne basecoat materials results in a significant increase in the cross-cut resistance (i.e., in the intercoat adhesion) in comparison to waterborne basecoat material 1.

The invention claimed is:

1. A method of using organic carboxylic acids having 1 to 10 carbon atoms, the method comprising using the organic carboxylic acids in preparation of aqueous basecoat materials for the purpose of improving the adhesion of these coating the aqueous basecoat materials to overbaked clearcoat materials.

2. The method as claimed in claim 1, wherein the organic carboxylic acids are monocarboxylic acids.

3. The method as claimed in claim 1, wherein the aqueous basecoat materials contain 0.1 to 5 wt % of organic carboxylic acids having 1 to 10 carbon atoms, based on a total amount of the respective aqueous basecoat material materials.

4. The method as claimed in claim 1, wherein the basecoat materials contain 0.3 to 1.5 wt % of organic carboxylic acids having 1 to 10 carbon atoms, based on a total amount of the respective aqueous basecoat materials.

5. The method as claimed in claim 1, wherein the organic carboxylic acids are selected from the group consisting of aliphatic carboxylic acids.

6. The method as claimed in claim 5, wherein the aliphatic carboxylic acids contain 1 to 6, preferably 1 to 3, more preferably 1 to 2 carbon atoms.

7. The method as claimed in claim 1, wherein the aqueous basecoat materials comprise at least one hydroxy-functional polymer as binder, wherein the hydroxy-functional polymer is selected from the group consisting of polyurethanes, polyesters, poly(meth)acrylates and/or copolymers of the stated polymers.

8. A method for producing a multicoat paint system on a substrate, wherein
(1) a substrate coated with a cured multicoat paint system is provided, wherein a topmost coat of the multicoat paint system is an overbaked clearcoat,
(2) an aqueous basecoat material comprising at least one organic carboxylic acid having 1 to 10 carbon atoms is applied directly to the overbaked clearcoat from stage (1), and a basecoat polymer film is formed from the applied basecoat material,
(3) a clearcoat material is applied to the basecoat polymer film obtained under stage (2), and subsequently
(4) the basecoat polymer film from stage (2) and the clearcoat film from stage (3) are cured together.

9. The method as claimed in claim 8, wherein the method further comprises a stage (2a) between the stages (2) and (3), in which directly atop the basecoat polymer film obtained under stage (2) at least one further basecoat material is applied and a topmost basecoat polymer film is formed from this at least one further basecoat material, with a clearcoat material then being applied in stage (3) directly atop the basecoat polymer film or the topmost basecoat polymer film produced in stage (2a), and subsequently, in stage (4), the basecoat polymer films from stages (2) and (2a) and the clearcoat film from stage (3) are cured together.

10. The method as claimed in claim 8, wherein the substrate is a metallic or plastics substrate.

11. The method as claimed in claim 8, wherein the overbaked clearcoat from stage (1) represents a topmost coat of a multicoat paint system exhibiting defects.

12. A multicoat paint system on a substrate, produced by a method as claimed in claim 8.

13. The method as claimed in claim 6, wherein the aliphatic carboxylic acids contain 1 to 3 carbon atoms.

14. The method as claimed in claim 13, wherein the aliphatic carboxylic acids contain 1 to 2 carbon atoms.

* * * * *